(12) United States Patent
Yabe et al.

(10) Patent No.: US 7,919,995 B2
(45) Date of Patent: Apr. 5, 2011

(54) LOAD CONTROLLER

(75) Inventors: Hiroo Yabe, Susono (JP); Tsuyoshi Uchikura, Kosai (JP); Tatsumi Tashiro, Toyota (JP); Akihiro Tanaka, Toyota (JP); Masahiro Kasai, Toyota (JP)

(73) Assignees: Yazaki Corporation, Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 39 days.

(21) Appl. No.: 12/332,851

(22) Filed: Dec. 11, 2008

(65) Prior Publication Data
US 2009/0153235 A1    Jun. 18, 2009

(30) Foreign Application Priority Data

Dec. 12, 2007  (JP) ................ 2007-320548

(51) Int. Cl.
*H03K 3/00*  (2006.01)
(52) U.S. Cl. .......................... 327/108
(58) Field of Classification Search .............. None
See application file for complete search history.

(56) References Cited

U.S. PATENT DOCUMENTS

| 4,728,861 | A | 3/1988 | Kurihara | |
|---|---|---|---|---|
| 6,781,316 | B2 | 8/2004 | Oda | |
| 7,245,163 | B2 * | 7/2007 | Nakamura | 327/110 |
| 2002/0171455 | A1 * | 11/2002 | Tsuchida et al. | 327/108 |
| 2005/0206436 | A1 * | 9/2005 | Harriman et al. | 327/427 |
| 2006/0267665 | A1 * | 11/2006 | Kawamoto | 327/427 |
| 2008/0224738 | A1 * | 9/2008 | Bodano et al. | 327/109 |

FOREIGN PATENT DOCUMENTS

| JP | 61-150847 A | 7/1986 |
|---|---|---|
| JP | 04-292231 A | 10/1992 |
| JP | 07-009911 A | 1/1995 |
| JP | 07-061285 A | 3/1995 |
| JP | 08-008076 A | 1/1996 |
| JP | 10-315850 A | 12/1998 |
| JP | 2000-185593 A | 7/2000 |
| JP | 2001-148294 A | 5/2001 |
| JP | 2003-054309 A | 2/2003 |

OTHER PUBLICATIONS

Japanese Office Action dated Nov. 6, 2009 in Application No. 2007-320548.

* cited by examiner

*Primary Examiner* — Lincoln Donovan
*Assistant Examiner* — Khareem E Almo
(74) *Attorney, Agent, or Firm* — Sughrue Mion, PLLC (57) ABSTRACT

A load controller includes: a first input circuit which detects that a drive instruction signal by an operation of a drive instructing unit is less or equal to a first input threshold value; a first constant current source activated in accordance with the detection; a PWM signal supply unit that is activated by the first constant current source and supplies a PWM signal having a prescribed frequency and a duty ratio; a constant control signal supply unit that supplies a constant control signal during failure of the first input circuit or the first constant current source; a drive control unit that generates a PWM drive control signal in accordance with the PWM signal and generates a constant drive control signal in accordance with the constant control signal; and a load driving element that is controlled by the PWM drive or constant drive control signal to drive a load.

6 Claims, 8 Drawing Sheets

LOAD CONTROLLER

BACKGROUND OF THE INVENTION

1. Technical Field

The present invention relates to a load controller, and more particularly to a load controller that can be operated even during the failure of an input side.

2. Background Art

As such kind of a load controller, a device is disclosed in JP-A-2001-148294. In this device, a chopping wave is allowed to be generated by a chopping wave generating circuit and the chopping wave is compared with a fixed input (a drive instruction signal) supplied from an ECU 32 by a comparator of an input circuit so as to output a drive control signal whose level is changed by a constant frequency and a duty ratio to a load and PWM-control the load.

However, in the above-described load controller, when the comparator of the input circuit is brought into a failure, the drive control signal is not outputted. When the load is a head lamp of a vehicle, the lamp is not turned on to deteriorate a safety in traveling. Since the input circuit comes into contact with the external part of the device, a static electricity or a surging voltage is apt to enter so that the input circuit is brought into a failure with a high possibility. Thus, a load controller has been desired in which even when an input part in the device is brought into a failure, the load can be driven at least with the lowest level.

SUMMARY OF THE INVENTION

By considering the above-described problem, according to the present invention, it is an object to provide a load controller in which a load can be driven at least with a minimum level even when an input side is brought into a failure and a safety is improved.

To solve the above-described problem, there is provided a load controller including: a first input circuit which detects that a drive instruction signal by an operation of a drive instructing unit is less or equal to a first input threshold value; a first constant current source activated in accordance with a detection by the first input circuit; a PWM signal supply unit that is activated by the first constant current source and supplies a PWM signal having a prescribed frequency and a duty ratio; a constant control signal supply unit that supplies a constant control signal during the failure of the first input circuit or the first constant current source; a drive control unit that generates a PWM drive control signal in accordance with the PWM signal supplied from the PWM signal supply unit and generates a constant drive control signal in accordance with the constant control signal supplied from the constant control signal supply unit; and a load driving element that is controlled by the PWM drive control signal or the constant drive control signal supplied from the drive control unit so as to drive a load.

Preferably, the constant control signal supply unit includes: a second input circuit which detects that the drive instruction signal by the operation of the drive instructing unit is less or equal to a second input threshold value set to be lower than the first input threshold value; a second constant current source that is activated in accordance with a detection by the second input circuit; a failure detecting unit that detects failure of the first input circuit or the first constant current source; and a constant control signal generating unit that generates the constant control signal in accordance with the activation of the second constant current source when the failure detecting unit detects the failure.

To solve the above-described problem, there is also provided a load controller including: a first input circuit which detects that a drive instruction signal by the operation of a drive instructing unit is less or equal to a first input threshold value; a first constant current source activated in accordance with a detection by the first input circuit; a first constant control signal supply unit that is activated by the first constant current source and supplies a first constant control signal; a second constant control signal supply unit that supplies a second constant control signal in accordance with the activation of a second constant current source during the failure of the first input circuit or the first constant current source; a drive control unit that generates a constant drive control signal in accordance with the first constant control signal supplied from the first constant control signal supply unit or the second constant control signal supplied from the second constant control signal supply unit; and a load driving element that is controlled by the constant drive control signal supplied from the drive control unit so as to drive a load.

Preferably, the second constant control signal supply unit includes: a second input circuit which detects that the drive instruction signal by the operation of the drive instructing unit is less or equal to a second input threshold value set to be lower than the first input threshold value; a second constant current source that is activated in accordance with a detection by the second input circuit; a failure detecting unit that detects failure of the first input circuit or the first constant current source; and a second constant control signal generating unit that generates the second constant control signal in accordance with the activation of the second constant current source when the failure detecting unit detects the failure.

According to the above configuration, in a load controller that operates in response to the drive instruction signal of a low level (Lo) to drive a load, the drive instruction signal is detected by the first input circuit having the first input threshold value. The first constant current source is activated in accordance with the detected result. The PWM signal supply unit is further activated by the activated first constant current source. During the failure of the first input circuit or the first constant current source, the constant control signal is supplied from the constant control signal supply unit. The PWM drive control signal is generated in accordance with the PWM signal from the PWM signal supply unit and the constant drive control signal is generated in accordance with the constant control signal supplied from the constant control signal supply unit by the drive control unit. The load driving element is controlled by the generated PWM drive control signal or the constant drive control signal so as to drive the load. Thus, since during the failure of an input side, a constant drive is carried out in place of a PWM control, even when the input side is brought into a failure, the load can be controlled without disturbing the PWM control operation of the load during a normal time and the safety of the device is improved.

According to the above configuration, the constant control signal supply unit includes a second input circuit which detects that the drive instruction signal by the operation of the drive instructing unit is less or equal to a second input threshold value set to be lower than the first input threshold value; a second constant current source that is activated in accordance with the detection of the second input circuit; a failure detecting unit that detects the failure of the first input circuit or the first constant current source; and a constant control signal generating unit that generates a constant control signal in accordance with the activation of the second constant current source when the failure detecting unit detects the failure. Thus, during the failure of an input side, the failure can be assuredly detected and the load can be driven by switching a PWM control during a normal time to a constant drive.

According to the above configuration, in a load controller that operates in response to the drive instruction signal of a low level (Lo) to drive a load, the drive instruction signal is detected by the first input circuit having the first input threshold value. The first constant current source is activated in accordance with the detected result. The first constant control signal supply unit is further activated by the activated first constant current source. During the failure of the first input circuit or the first constant current source, the second constant control signal is supplied from the second constant control signal supply unit. The constant drive control signal is generated in accordance with the first constant control signal supplied from the first constant control signal supply unit or the second constant control signal supplied from the second constant control signal supply unit by the drive control unit. The load driving element is controlled by the generated constant drive control signal so as to drive the load. Thus, since during the failure of an input side, a constant drive is carried out on the basis of the second constant control signal in place of a constant drive on the basis of the first constant control signal, even when the input side is brought into a failure, the constant drive of the load can be realized without disturbing the constant drive operation of the load during a normal time and the safety of the device is improved.

According to the above configuration, the constant control signal supply unit includes a second input circuit which detects that the drive instruction signal by the operation of the drive instructing unit is less or equal to a second input threshold value set to be lower than the first input threshold value; a second constant current source that is activated in accordance with the detection of the second input circuit; a failure detecting unit that detects the failure of the first input circuit or the first constant current source; and a second constant control signal generating unit that generates a second constant control signal in accordance with the activation of the second constant current source when the failure detecting unit detects the failure. Thus, during the failure of an input side, the failure can be assuredly detected and the constant drive of the load can be continuously carried out similarly to the constant drive during a normal time.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Now, embodiments of the present invention will be described below by referring to the drawings.

First Embodiment

Figure 1:
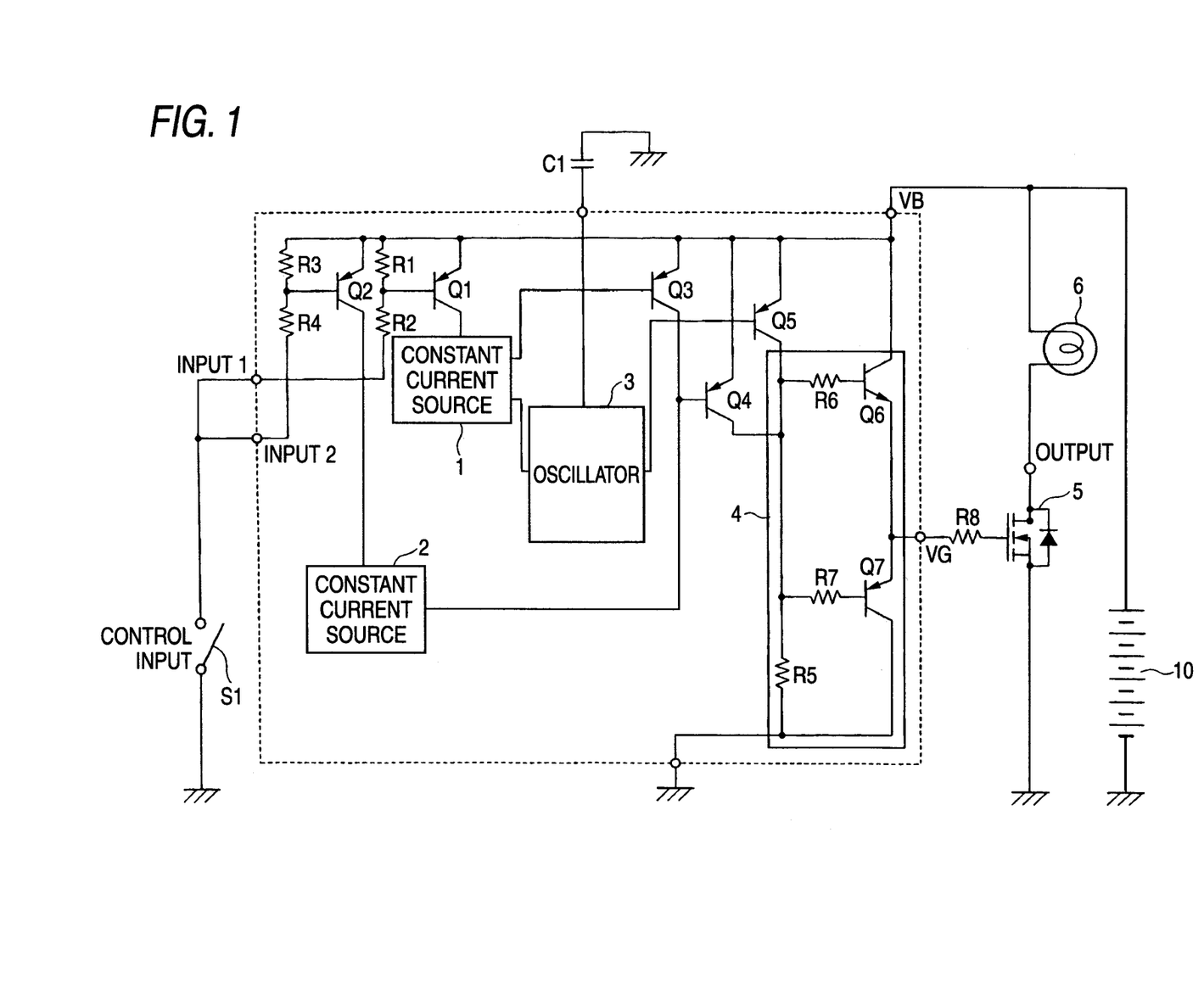
FIG. 1 is a circuit diagram showing a load controller according to a first embodiment of the present invention.

FIG. 1 is a circuit diagram showing a load controller according to a first embodiment of the present invention. In this embodiment, a case is described that a lamp mounted on a vehicle (for instance a head lamp, etc.) as a load is constantly driven.

In FIG. 1, the load controller includes transistors Q1 to Q7, resistances R1 to R8, a capacitor C1, an input switch S1, constant current sources 1 and 2, an oscillator 3, an N channel MOSFET (refer it to as an NMOSFET, hereinafter) 5 as a load driving element, a lamp 6 mounted on a vehicle as a load and a battery 10.

In this device, an input part includes two pairs of input circuits and constant current sources. A first input circuit includes a pnp-typed transistor Q1 and resistances R1 and R2 and the constant current source 1 as a first constant current source is driven thereby. The emitter of the transistor Q1 and one side of the resistance R1 are connected to the battery 10. The other side of the resistance R1 is connected to the base of the transistor Q1 and one side of the resistance R2. The other side of the resistance R2 is connected to one of the input switch S1 as a drive instructing unit. The other side of the input switch S1 is grounded. A collector of the transistor Q1 is connected to the constant current source 1.

A second input circuit includes a pnp-typed transistor Q2 and resistances R3 and R4 and the constant current source 2 as a second constant current source is driven thereby. The emitter of the transistor Q2 and one side of the resistance R3 are connected to the battery 10. The other side of the resistance R is connected to the base of the transistor Q2 and one side of the resistance R4. The other side of the resistance R4 is connected to one side of the input switch S1. A collector of the transistor Q2 is connected to the constant current source 2. The first input circuit and the second input circuit detect the turning on operation of the input switch S1, however, a second input threshold value in the second input circuit is set to a voltage value lower than a first input threshold value in the first input circuit.

The constant current source 1 has two outputs and one output drives the oscillator 3 and the other output is connected to the base of a pnp-typed transistor Q3. The emitter of the transistor Q3 is connected to the battery 10.

As the oscillator 3, any of oscillators in which a PWM signal having a prescribed frequency and a duty ratio is generated may be employed without a special limitation. The output of the oscillator 3 is connected to the base of a pnp-typed transistor Q5. The emitter of the transistor Q5 is connected to the battery 10. To the oscillator 3, the capacitor C1 for setting the prescribed frequency and the duty ratio is connected. The oscillator 3 and the transistor Q5 correspond to the PWM signal supply unit.

The output of the constant current source 2 is connected to the collector of the transistor Q3 and the base of a pnp-typed transistor Q4. The emitter of the transistor Q4 is connected to the battery 10 and the collector thereof is connected to the collector of the transistor Q5. The transistor Q4 is connected in parallel with the transistor Q5 and connected to a driving part 4. The transistor Q3 corresponds to the failure detecting unit. The transistor Q4 corresponds to the constant control signal generating unit. The transistors Q3 and Q4 correspond to the constant control signal supply unit together with the second input circuit (R3, R4, Q2) and the constant current source 2.

The driving part 4 includes a pnp-typed transistor Q6, a pnp-typed transistor Q7, and the resistances R5 to R7. One side of the resistance R5 is connected to the collectors of the transistors Q4 and Q5, one side of the resistance R6 and one side of the resistance R7, and the other side of the resistance R5 is grounded. The other side of the resistance R6 is connected to the base of the transistor Q6. The other side of the resistance R7 is connected to the base of the transistor Q7. The collector of the transistor Q6 is connected to the battery 10, and the emitter thereof is connected to the emitter of the transistor Q7 and one side of the resistance R8. The collector of the transistor Q7 is grounded. The driving part 4 corresponds to the drive control unit.

An output part includes the resistance R8 and the NMOSFET 5 as the load driving element. The gate of the NMOSFET 5 is connected to the emitters of the transistors Q6 and Q7 through the resistance R8. The drain of the NMOSFET 5 is connected to the battery 10 through the lamp 6 mounted on a vehicle as the load and a source thereof is grounded.

When an output of the oscillator 3 becomes a low level (LO), the transistor Q5 is turned on and a current is supplied to the base of the transistor Q6 from the collector thereof through the resistance R6. Thus, the transistor Q6 is activated and the gate voltage VG of the NMOSFET 5 is raised to turn on the NMOSFET 5. The NMOSFET 5 is located in a downstream side of the load, like the above-described usual example.

Figure 2:
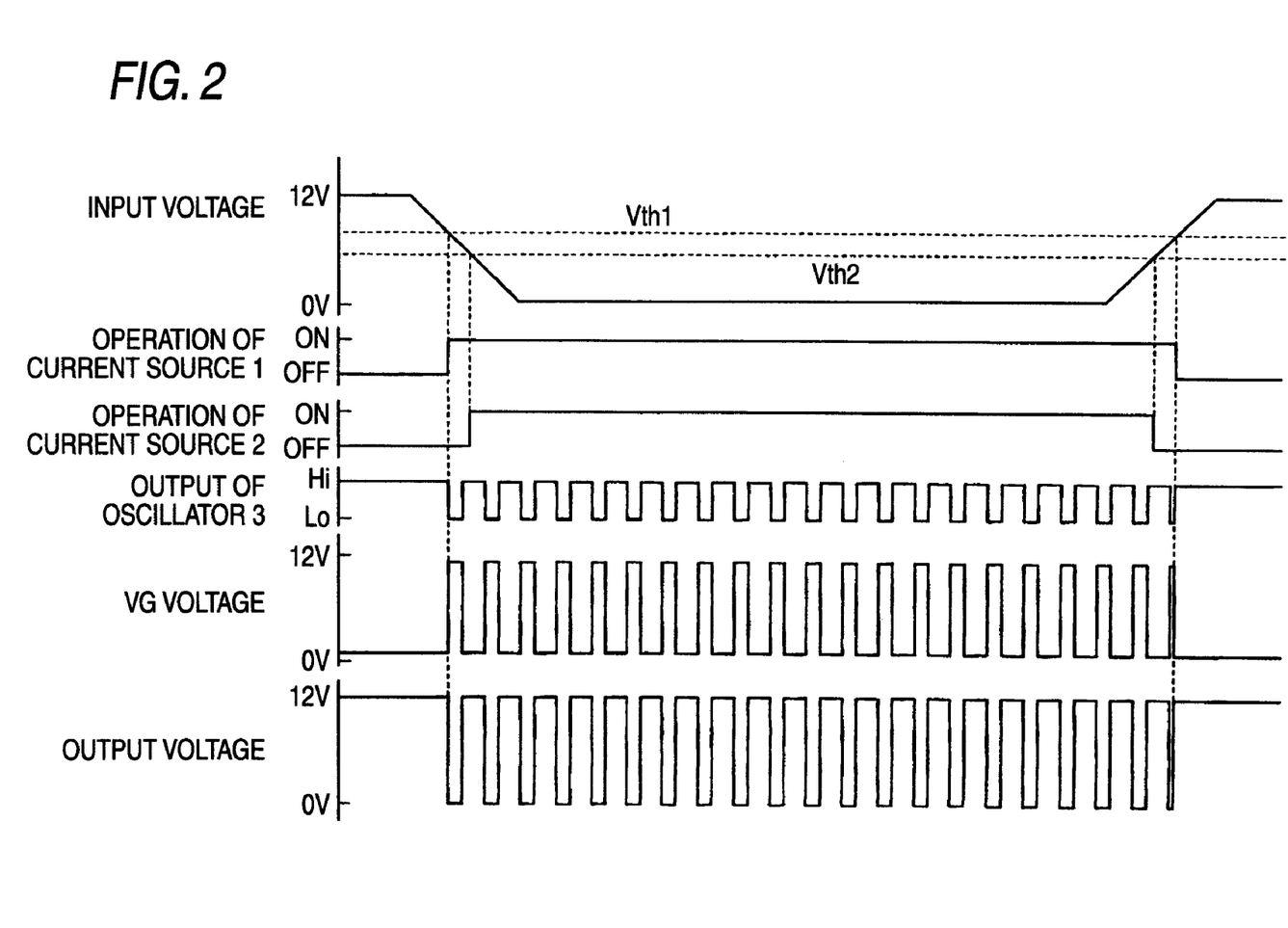
FIG. 2 is a timing chart of signals of respective parts during a normal time in the load controller shown in FIG. 1.

Now, an operation of the load controller during a normal time shown in FIG. 1 will be described by referring to a timing chart of signals of respective parts shown in FIG. 2.

When the input switch S1 is turned off and an input voltage (a drive instruction signal) is higher than a first threshold value Vth1 of the first input circuit, both the transistors Q1 and Q2 are turned off and the constant current sources 1 and 2 are stopped. Assuming that a forward voltage between the base and emitter in the base of the transistor Q1 is Vbe, the first input threshold value Vth1 is given by a below-described equation (1).

$$Vth1=VB-Vbe*(R1+R2)/R1 \quad (1)$$

Then, when the input switch S1 is turned on and an input is grounded so that the input voltage is lowered to be lower than the first input threshold value Vth1, the transistor Q1 is turned on. Thus, the constant current source 1 is activated to start an operation and a constant current is supplied to the respective part. Thus, the oscillator 3 is activated to oscillate and generate a PWM signal and the transistor Q3 is turned on.

Subsequently, when the input voltage is further lowered to be lower than a second input threshold value Vth2, the transistor Q2 is turned on and the constant current source 2 starts an operation. However, since a voltage between the emitter and the collector of the transistor Q3 falls substantially 0 V, all the current of the constant current source 2 is supplied to the transistor Q3. Accordingly, the base current of the transistor Q4 is not supplied so that the transistor Q4 remains turned off.

Therefore, the PWM signal is outputted from the oscillator 3 so that the base of the transistor Q5 becomes a low level (LO). Thus, when the base current is supplied, the transistor Q5 is turned on. A part of the current from the collector of the transistor Q5 is supplied to the base of the transistor Q6 through the resistance R6. The transistor Q6 is activated to raise the gate voltage VG of the NMOSFET 5 and turn on the NMOSFET 5. When the NMOSFET 5 is turned on, an output voltage of a drain side thereof becomes substantially 0 V, and a source voltage VB of the battery 10 is applied to the lamp 6 mounted on a vehicle to supply a current.

On the other hand, when the output of the PWM signal of the oscillator 3 becomes a high level (Hi), the transistor Q5 is turned off, the base current of the transistor Q6 is stopped to turn off the transistor Q6, and an electric charge stored in the gate of the NMOSFET 5 is supplied to a ground side through the base of the transistor Q7, and the resistances R7 and R5. Accordingly, the transistor Q7 is activated so that the gate voltage VG of the NMOSFET 5 becomes a low level (Lo) to turn off the NMOSFET 5. Accordingly, the current is not supplied to the lamp 6 mounted on a vehicle.

As described above, in accordance with the supply of the PWM signal from the oscillator 3 and the transistor Q5, a PWM drive control signal is generated in the driving part 4 and an operation for controlling the NMOSFET 5 to be turned on/off is repeated to obtain a PWM output. Thus, the lamp 6 mounted on a vehicle is driven under a PWM control to be turned on.

The first input threshold value Vth1 is set to be higher than the second input threshold value Vth2, so that the transistor Q3 is turned on before the transistor Q4. Accordingly, when the input part is normal, a primary PWM control operation can be assuredly obtained. An unevenness can be reduced by a contrivance that the transistor Q1 and the transistor Q2 and the resistances R1 to R4 which are formed in the same production process are used, and the first input threshold value can be assuredly set to be higher than the second input threshold value.

Figure 3:
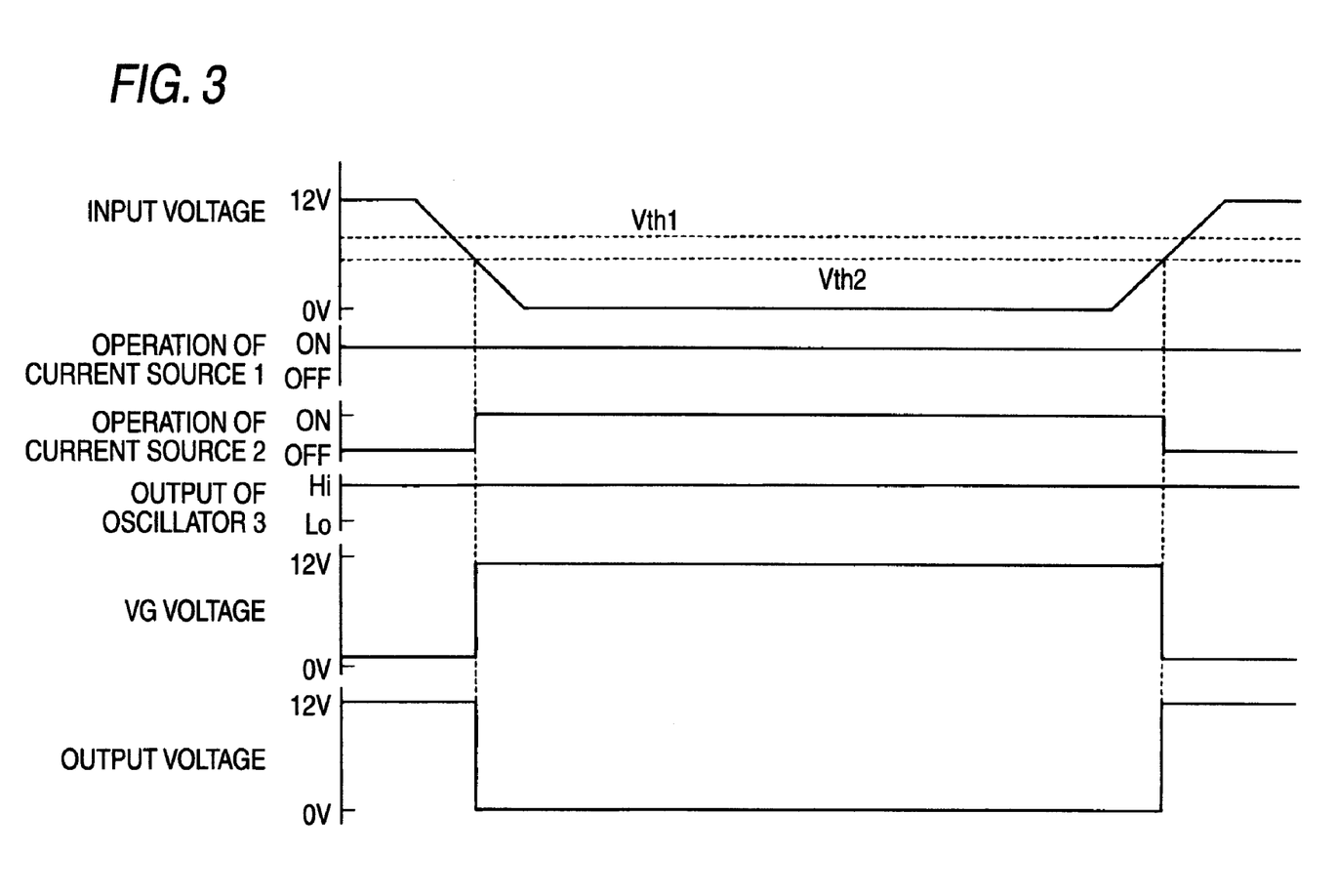
FIG. 3 is a timing chart of signals of respective parts during a failure in the load controller shown in FIG. 1.

Now, an operation carried out when the first input circuit or the constant current source 1 is brought into a failure will be described by referring to a timing chart shown in FIG. 3.

In this case, even when the input switch S1 is turned on and the input voltage falls to be lower than the first input threshold value, the constant current source 1 does not operate and the constant current is not supplied. Accordingly, the output of the oscillator 3 remains high (Hi) and the transistor Q3 is turned off. Since the transistor Q3 that is to be turned on by the constant current source 1 is turned off during the normal time, the transistor Q3 serves as the failure detecting unit for detecting the failure of the first input circuit or the constant current source 1.

Further, the input voltage falls to be lower than the second input threshold value, the second constant current source 2 starts the operation. Since the transistor Q3 is turned off, the base current of the transistor Q4 is supplied to turn on the transistor Q4. Thus, a part of the current supplied from the battery 10 through the collector of the transistor Q4 is supplied to the base of the transistor Q6 through the resistance R6 as a constant control signal. Thus, the transistor Q6 is activated to raise the gate voltage VG of the NMOSFET 5, turn on the NMOSFET 5 and supply the current to the lamp 6 mounted on a vehicle. Then, the lamp 6 mounted on a vehicle is turned on.

As described above, in accordance with the supply of the constant control signal from the transistor Q4, a constant drive control signal is generated in the driving part 4. An operation for controlling the NMOSFET 5 to be turned on is carried out by this constant drive control signal to drive and turn on the lamp 6 mounted on a vehicle.

As described above, when the input part is normal, the lamp 6 mounted on the vehicle is turned on under the normal PWM control. On the other hand, when the input part, that is, the first input circuit or the constant current source 1 is brought into a failure, the lamp 6 mounted on the vehicle is turned on by a constant DC current, so that the safety of the device is enhanced.

Figure 4:
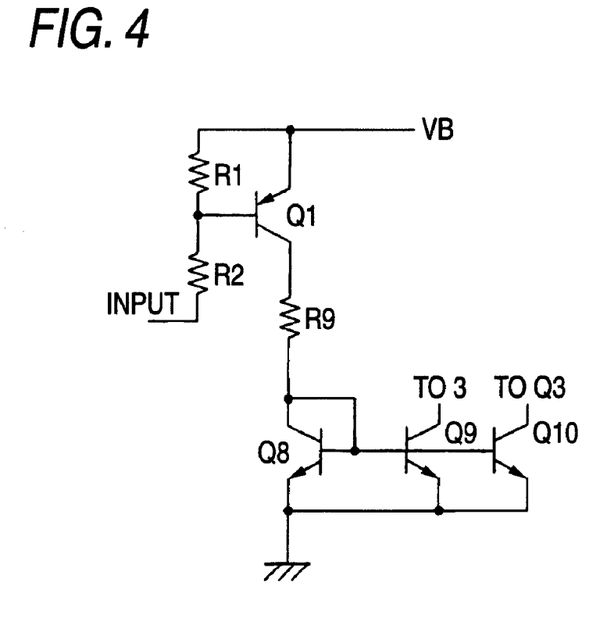
FIG. 4 is a circuit diagram showing a specific circuit example 1 of an input circuit and a constant current source in FIG. 1.

FIG. 4 is a circuit diagram showing a specific circuit example 1 of the first input circuit and the constant current source 1 (and the second input circuit and the constant current source 2). Transistors Q8 to Q10 form a current mirror.

Figure 5:
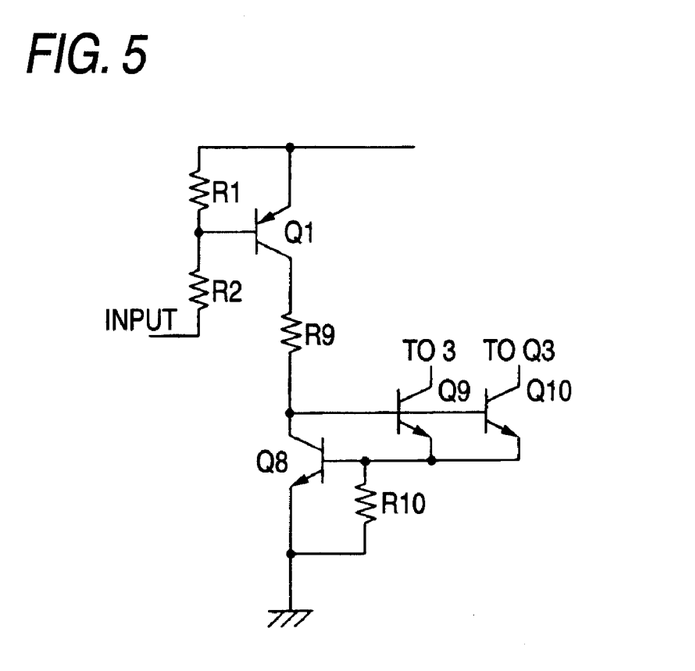
FIG. 5 is a circuit diagram showing a specific circuit example 2 of an input circuit and a constant current source in FIG. 1.

FIG. 5 is a circuit diagram showing a specific circuit example 2 of a first switch unit and the constant current source 1 (and a second switch unit and the constant current source 2) of the input part. Transistors Q8 to Q10 form a current mirror.

As described above, according to this embodiment, in the load controller having the oscillator incorporated that operates by a low (Lo) input and PWM drives the load by inputting a control signal (a fixed input), the first input threshold value Vth1 is formed by the first input part composed of the combination of the first input circuit and the first constant current source. Similarly, the second input threshold value Vth2 is formed by the second input part composed of the second input circuit and the second constant current source 2. The second input threshold value Vth2 is set to be lower than the first input threshold value Vth1. Only when the first input part is brought into a failure, the operation of the second input part is valid, so that the driving part 4 is directly driven without using the oscillator 3. Accordingly, the PWM control operation during the normal time is not disturbed, and even when the first input part is brought into a failure, the load can be driven and the safety of the device is improved.

Second Embodiment

Figure 6:
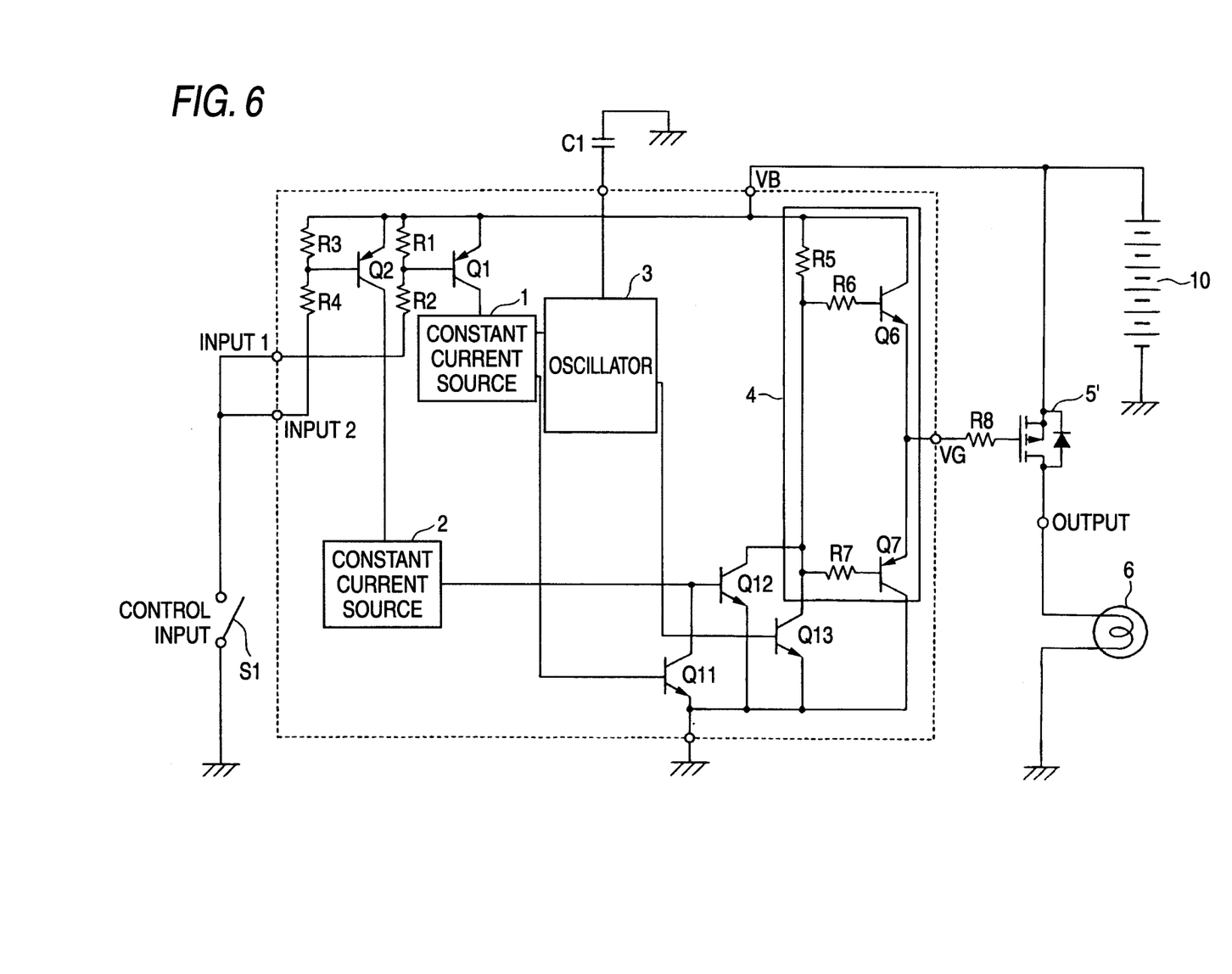
FIG. 6 is a circuit diagram showing a load controller according to a second embodiment of the present invention.

FIG. 6 is a circuit diagram showing a load controller according to a second embodiment of the present invention. In the second embodiment, a PMOSFET 5' is arranged in an upstream side (a high side) of a lamp 6 mounted on a vehicle as a load in place of the NMOSFET 5 of the first embodiment. Further, the transistors Q3 to Q5 in the first embodiment are deleted and non-typed transistors Q11 to Q13 are provided in place thereof.

In the transistor Q11, a base is connected to a constant current source 1, a collector is connected to a constant current source 2 and an emitter is grounded. In the transistor Q12, a base is connected to the constant current source 2, a collector is connected to one hands of resistances R5, R6 and R7 respectively and an emitter is grounded. In the transistor Q13, a base is connected to an output of an oscillator 3, a collector is connected to the one sides of the resistances R5, R6 and R7 and an emitter is grounded. The other side of the resistance R5 is connected to a battery 10. Other structures are the same as those of the first embodiment.

In this embodiment, since the PMOSFET 5' is used, when a gate voltage VG is in a low level (Lo), the PMOSFET 5' is turned on. Transistors driven by the constant current sources 1 and 2 and the oscillator 3 are also changed to pnp-typed transistors. A direction in which a constant current flows is opposite to that of the first embodiment shown in FIG. 1. Thus, the current flows from the constant current sources 1 and 2. Further, in the operation of the oscillator 3, a relation of a high level (Hi) and a low level (Lo) is opposite to that of the first embodiment. However, a turning on state of the lamp 6 mounted on a vehicle as the load to an input is the same as that of the first embodiment.

Third Embodiment

Figure 7:
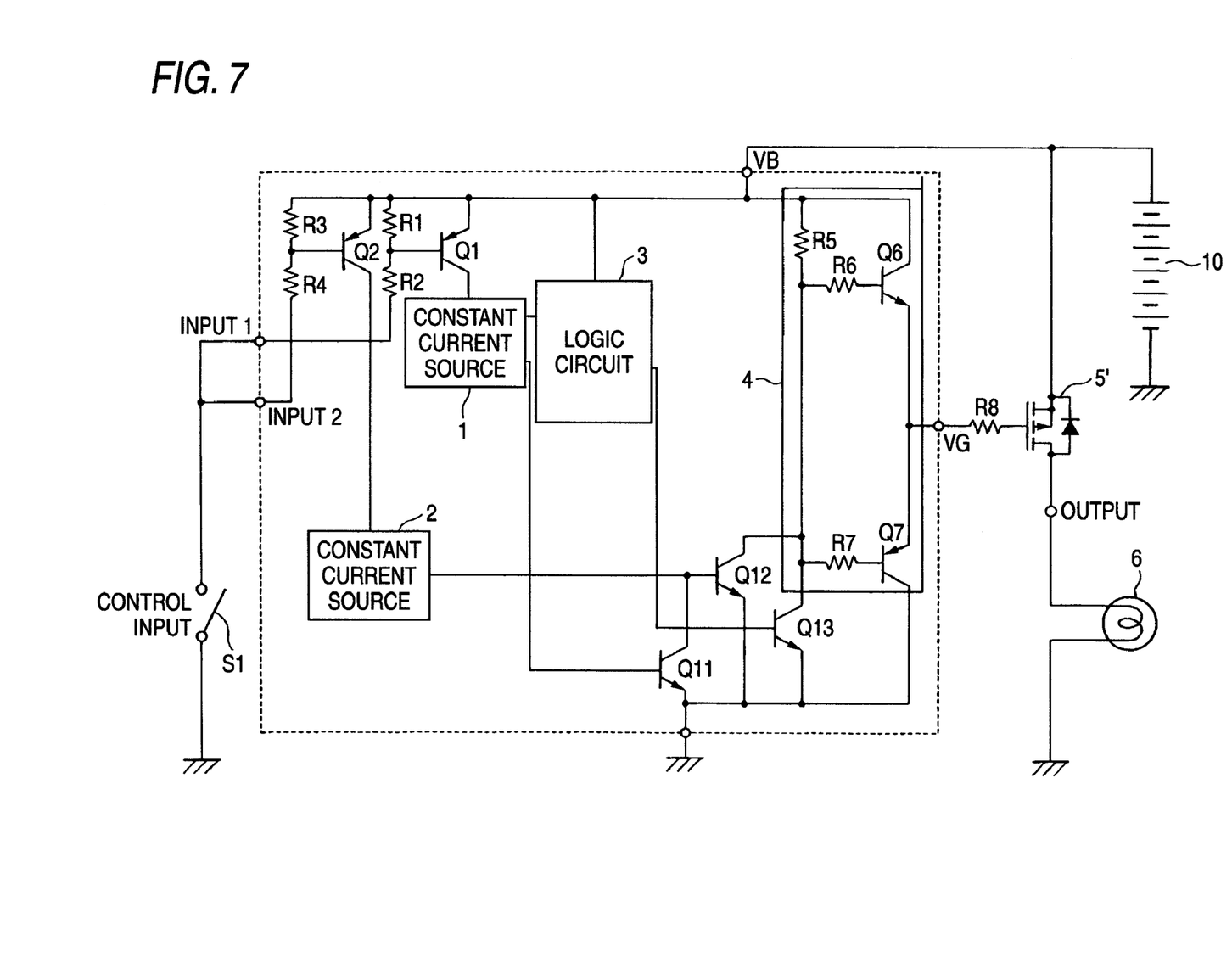
FIG. 7 is a circuit diagram showing a load controller according to a third embodiment of the present invention.

FIG. 7 is a circuit diagram showing a load controller according to a third embodiment of the present invention. In the third embodiment, a logic circuit 7 is provided in place of the oscillator 3 in the second embodiment. Other structures are the same as those of the second embodiment. Timing charts of respective signals during a normal time and during the failure of an input side in this embodiment are shown in FIGS. 8 and 9.

Figure 8:
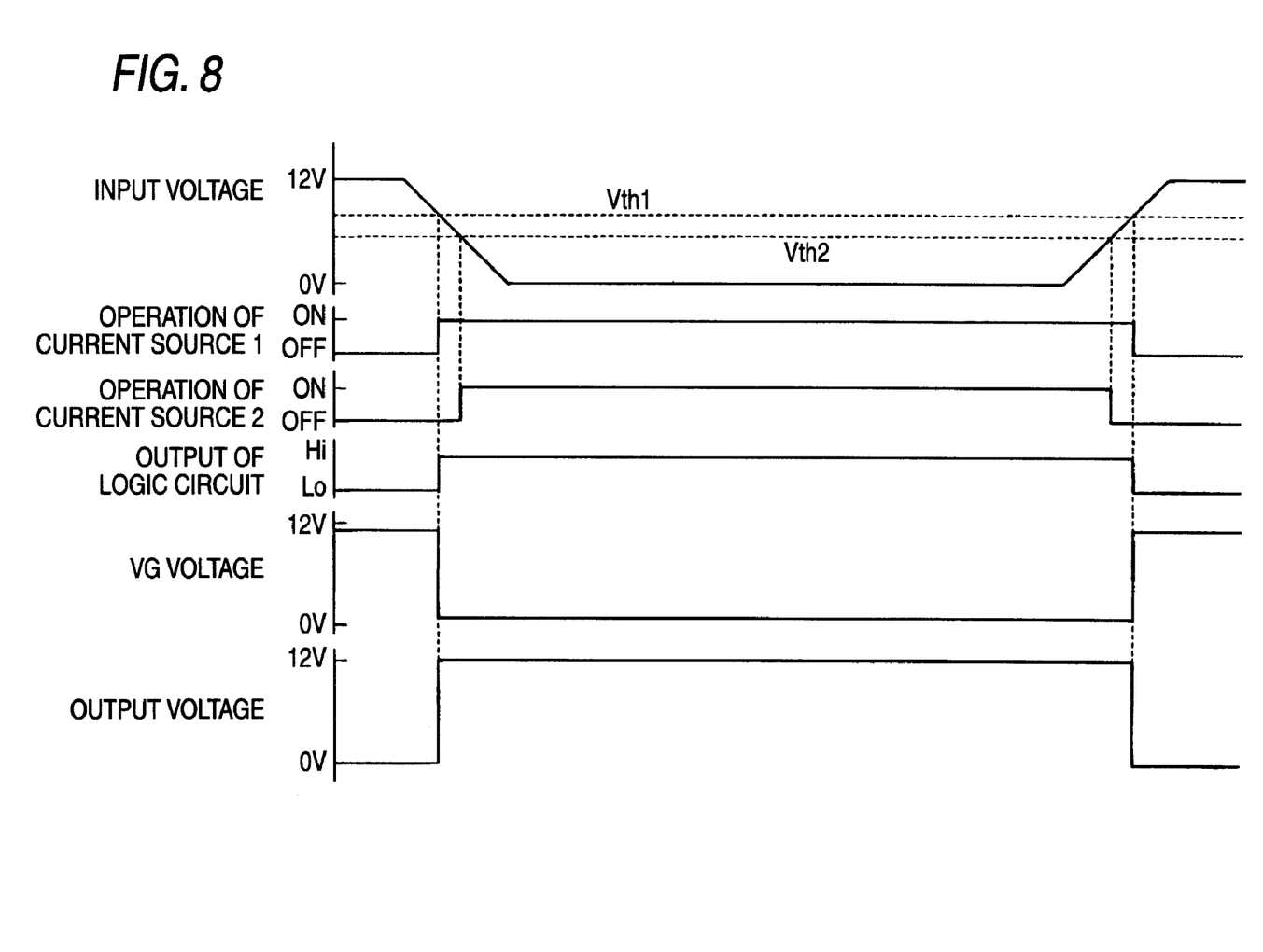
FIG. 8 is a timing chart of signals of respective parts during a normal time in the load controller shown in FIG. 7.
Figure 9:
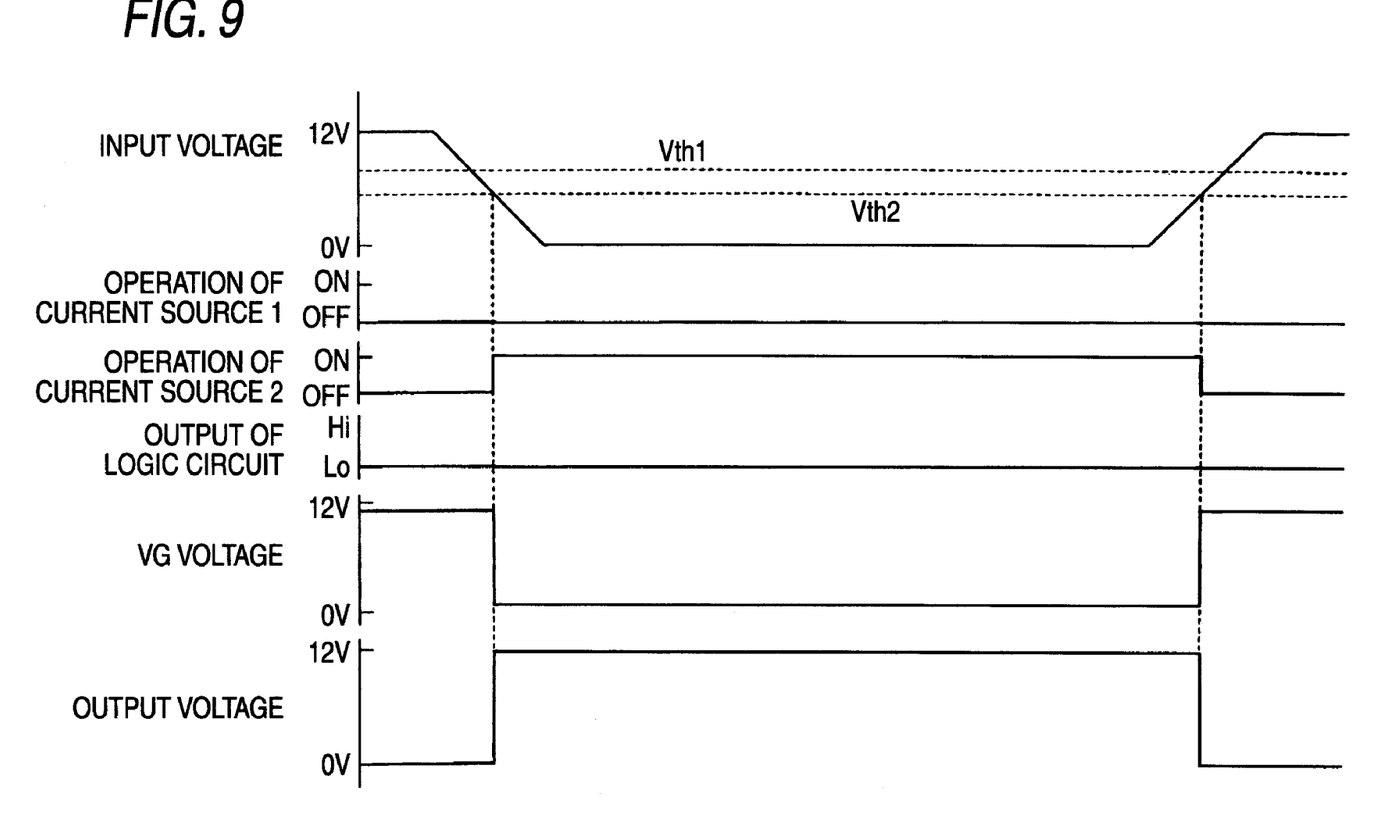
FIG. 9 is a timing chart of signals of respective parts during a failure in the load controller shown in FIG. 7.

As shown in the timing chart of FIG. 8, during the normal time, when an input switch S1 is turned on and an input voltage is lower than a first input threshold value Vth1, a transistor Q1 is turned on and a constant current source 1 starts an operation. Thus, a transistor Q11 is turned on and the logic circuit 7 is activated to output a high (Hi) signal as a first constant control signal from the logic circuit 7. Thus, a transistor Q13 is turned on and a base current of a transistor Q7 is supplied to a ground through a resistor R7 and the collector of the transistor Q13, so that the transistor Q7 is activated. Thus, a gate voltage VG as a first constant drive control signal becomes a low level to turn on a PMOSFET 5'. Thus, the PMOSFET 5' is constantly driven to drive and turn on a lamp 6 mounted on a vehicle.

Further, when the input voltage is lower than a second input threshold value Vth2, a constant current source 2 starts an operation, however, since the transistor Q11 is turned on, a transistor Q12 remains turned off.

On the other hand, when a first input circuit or the constant current source 1 is brought into a failure, even when the input switch S1 is turned on and the input voltage falls to be lower than the first input threshold value Vth1, the constant current source 1 does not start the operation and the constant current is not supplied. Thus, the transistor Q11 is turned off and an output from the logic circuit 7 remains low to turn off the transistor Q13.

Further, the input voltage falls to be lower than the second input threshold value Vth2, the constant current source 2 is activated. Since the transistor Q11 is turned off, the transistor Q12 is turned on. Thus, since the base current of the transistor Q7 is supplied to the ground through the resistance R7 and the collector of the transistor Q12 as a first constant control signal, the transistor Q7 is activated and the gate voltage VG as a second constant derive control signal becomes a low level to turn on the PMOSFET 5'. Thus, the PMOSFET 5' is constantly driven to drive and turn on the lamp 6 mounted on a vehicle.

As described above, according to this embodiment, in the load controller having the logic circuit incorporated that operates by a low (Lo) input and pulse drives the load by inputting a control signal (a fixed input), the first input threshold value Vth1 is formed by the first input part composed of the combination of the first input circuit and the constant current source 1. Similarly, the second input threshold value Vth2 is formed by the second input part composed of the second input circuit and the constant current source 2. The second input threshold value Vth2 is set to be lower than the first input threshold value Vth1. Only when the first input part is brought into a failure, the operation of the second input part is valid, so that the driving part 4 is directly driven without using the logic circuit 7. Accordingly, a constant drive operation during the normal time is not disturbed, and even when the first input part is brought into a failure, the load can be driven and the safety of the device is improved.

As described above, the embodiments of the present invention are explained, however, the present invention is not limited thereto and various changes or applications may be made.

For instance, in the circuit diagrams of the above-described embodiments, a part of the circuits enclosed by doted lines may be formed with ICs.

What is claimed is:

1. A load controller, comprising:
   a first input circuit which detects that a drive instruction signal by an operation of a drive instructing unit is less or equal to a first input threshold value;
   a first constant current source activated in accordance with a detection by the first input circuit;
   a PWM signal supply unit that is activated by the first constant current source and supplies a PWM signal having a prescribed frequency and a duty ratio;
   a constant control signal supply unit that includes a failure detecting unit that detects failure of the first input circuit or the first constant current source, and that supplies a constant control signal during the failure of the first input circuit or the first constant current source which the failure detecting unit detects;
   a drive control unit that generates a PWM drive control signal in accordance with the PWM signal supplied from the PWM signal supply unit when the failure detecting unit does not detect the failure and generates a constant drive control signal in accordance with the constant control signal supplied from the constant control signal supply unit when the failure detecting unit detects the failure; and
   a load driving element that is controlled by the PWM drive control signal supplied from the drive control unit so as to drive a load by PWM control when the failure detecting unit does not detect the failure, and controlled by the constant drive control signal supplied from the drive control unit so as to drive the load by constant current control when the failure detecting unit detects the failure.

2. The load controller according to claim 1, wherein the constant control signal supply unit includes:
   a second input circuit which detects that the drive instruction signal by the operation of the drive instructing unit is less or equal to a second input threshold value set to be lower than the first input threshold value;
   a second constant current source that is activated in accordance with a detection by the second input circuit; and
   a constant control signal generating unit that generates the constant control signal in accordance with the activation of the second constant current source when the failure detecting unit detects the failure.

3. A load controller, comprising:
   a first input circuit which detects that a drive instruction signal by the operation of a drive instructing unit is less or equal to a first input threshold value;
   a first constant current source activated in accordance with a detection by the first input circuit;
   a first constant control signal supply unit that is activated by the first constant current source and supplies a first constant control signal;
   a second constant control signal supply unit that includes a failure detecting unit that detects failure of the first input circuit or the first constant current source and that supplies a second constant control signal in accordance with the activation of a second constant current source during the failure of the first input circuit or the first constant current source which the failure detecting unit detects;
   a drive control unit that generates a constant drive control signal in accordance with the first constant control signal supplied from the first constant control signal supply unit when the failure detecting unit does not detect the failure and the second constant control signal supplied from the second constant control signal supply unit when the failure detecting unit detects the failure; and
   a load driving element that is controlled by the constant drive control signal supplied from the drive control unit so as to drive a load in a constant driving operation.

4. The load controller according to claim 3, wherein the second constant control signal supply unit includes:
   a second input circuit which detects that the drive instruction signal by the operation of the drive instructing unit is less or equal to a second input threshold value set to be lower than the first input threshold value;
   a second constant current source that is activated in accordance with a detection by the second input circuit; and
   a second constant control signal generating unit that generates the second constant control signal in accordance with the activation of the second constant current source when the failure detecting unit detects the failure.

5. The load controller according to claim 1, wherein the first constant current source outputs a constant current to the PWM signal supply unit and the failure detection unit.

6. The load controller according to claim 3, wherein the first constant current source outputs a constant current to the first constant control signal supply unit and the failure detection unit.

* * * * *